Figure 1:
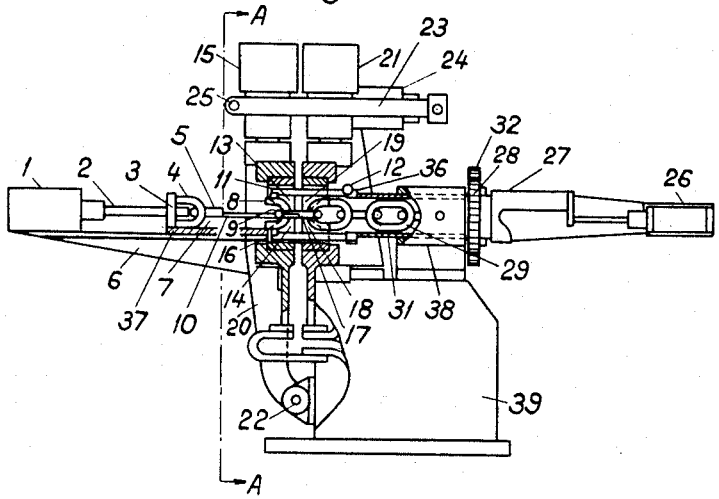

May 19, 1964 — E. WEHLIN ETAL — 3,134,009

METHOD FOR MAKING CHAINS

Original Filed Dec. 28, 1956 — 2 Sheets-Sheet 1

Inventors
EGON WEHLIN
BROR ANDERSSON

By Bailey, Stephens & Huettig
Attorney

May 19, 1964   E. WEHLIN ETAL   3,134,009
METHOD FOR MAKING CHAINS
Original Filed Dec. 28, 1956   2 Sheets-Sheet 2

Inventor
EGON WEHLIN
BROR ANDERSSON

By Bailey, Stephens & Huettig
Attorney

United States Patent Office 3,134,009
Patented May 19, 1964

3,134,009
METHOD FOR MAKING CHAINS
Egon Wehlin, Hammarby, and Bror Andersson, Stockholm, Sweden, assignors to Allmanna Svenska Elektriska Aktiebolaget, Vasteras, Sweden, a corporation of Sweden
Original application Dec. 28, 1956, Ser. No. 631,248. Divided and this application June 22, 1960, Ser. No. 42,738
Claims priority, application Sweden Dec. 28, 1955
2 Claims. (Cl. 219—52)

It has already been known to make chains and chain links by resistance butt welding or by means of flash welding. Generally the chain links have been made from straight rods and hooked together and then been welded. It has previously been known to make chains by welding together U-formed linked chain pieces by means of butt or flash welding.

By butt welding the slag content in the weld is increased when the welding area has increased whereby the welding result was bad and the risk of a fracture at the weld is great when the welding area is large. Owing to this only chain links made of material having a diameter less than 12 mm. can be welded by the butt welding method with good results. Chains of material having a diameter of more than 12 mm. have been made previously by the flash welding method.

This welding method is not, however, profitable when the material in the chain links has a diameter less than about 25 mm. The reason is that material is lost in spatter in the bulge at the welding which bulge must usually be removed. In addition to this the welding takes a comparatively long time.

The present invention relates to a method for making chains, especially such chains in which the diameter of the material in the chain links is between 12 and 25 mm. The method is mainly characterised in that the chain is made by welding together two U-formed parts, the end surfaces of which are formed in a way that is suitable for real projection welding for example tapered or convex formed end surfaces and in that a welding pressure of between 4–6 kg. per mm.$^2$ and a welding current of between 50–80 a. per mm.$^2$, is chosen. As the end surfaces of the U-formed parts are tapered or convex, slag between the end surfaces which are welded together, is pressed out against a perphery and is mainly accumulated at the surface of the bulge, so that inside the weld there is very little slag left. As the slag accumulates at the surface in the bulge and the bulge is much smaller than that formed by the butt welding, a perfect cross-section area at least as great as the area in the material used, is achieved, although the material losses are small.

The invention also relates to a semi or fully automatic chain welding machine for making a chain by the method mentioned above. This machine is chiefly characterised in that it is provided with a pair of stationary clamping dies for holding a U-formed link part which is hooked together with the last link of the already welded chain and a pair of clamping dies movable in a longitudinal direction in the machine, in which one of two linked parts hooked together is held and by the movement of the clamping dies against the welding position, is forced into contact with the link part held by the stationary pair of clamping dies and with a longitudinal movable device having grasping arms which take the U-formed link part hooked together with the link between the movable clamping dies and after welding, transports this link part and the last welded chain link through both the pairs of clamping dies and after a turn of 90° places the U-formed link part between the pair of stationary clamping dies. In order to avoid the chain twisting during the production the said longitudinal movable device is turned by its operating member in such a way that it turns alternatively, ±90° and —90° from its normal position. The normal position is that which the movable device has when its grasping arms are moved through the pairs of clamping dies. The welding machine is also provided with a loading device for placing the U-formed links between the movable pair of clamping dies. This loading device is provided with a block having a T groove in which two U-formed links, in two successive chain links are placed in the relative position they shall have during the welding operation, an operating member which moves the said link parts along the T groove and places them between the movable pair of clamping dies without changing their relative positions.

Figure 2:
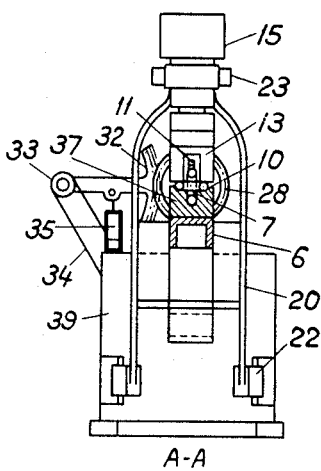
Figure 3:
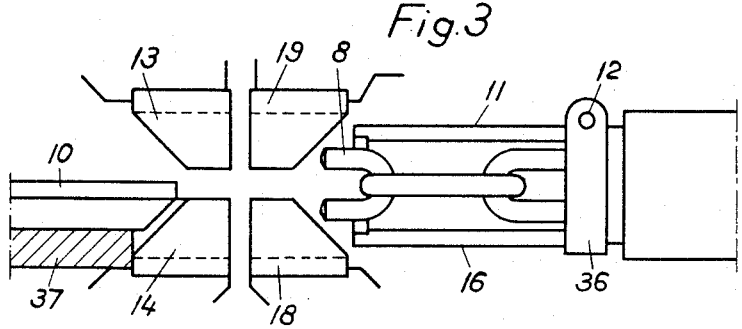
Figure 4:
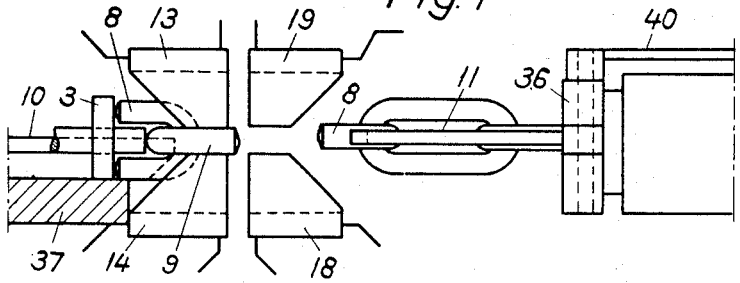
Figure 5:
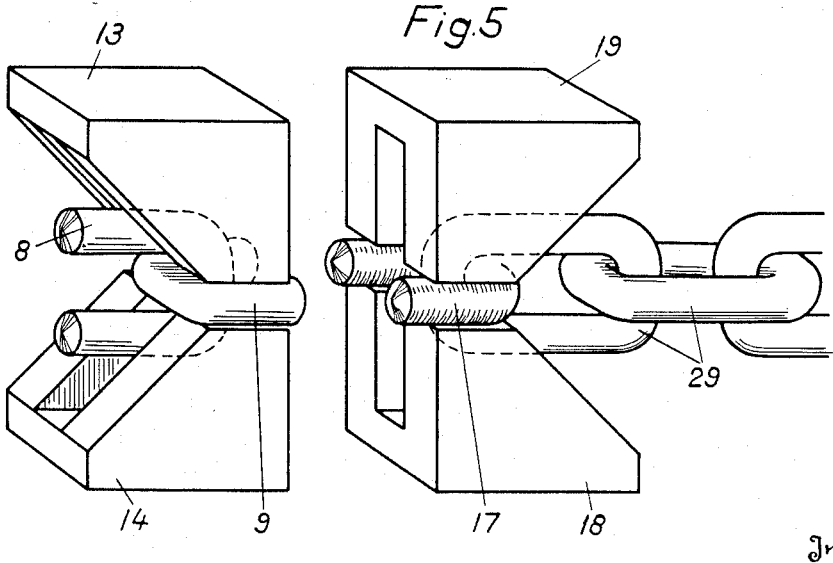

One embodiment of the invention is shown on the accompanying drawing, FIG. 1 is a side elevational view of the welding machine, partly in section, FIG. 2 an end view and a section at A—A in FIG. 1, FIGS. 3 and 4 are side elevational views of the pairs of clamping dies and the movable device for taking the U-formed link which is hooked with a welded link, through the pairs of clamping dies and placing the link between the stationary clamping dies. In these figures the loading block is shown in section. FIG. 5 is a perspective view of the pair of clamping dies and link parts.

In the figures, 39 is a machine stand carrying a stationary pair of clamping dies, having a clamping die 19 which is connected to the piston and operating cylinder 21 and movable against the clamping die 18. In the stand 39 a swinging bracket 20 is mounted on a bearing 22. This bracket carries a movable pair of clamping dies having a die 13 which is connected to a piston in the operating cylinder 15 and movable against the die 14. Two rods 23 journalled on the studs 25 are connecting the swinging bracket 20 with the piston in the operating cylinder 24. The welding machine is also provided with an opening mechanism consisting of a tubular part 31 which can be turned and axially moved in a sleeve 38 and connected to the piston in the operating cylinder 26 by a connecting rod and the part 27. The tubular part carries a support 36 being provided with two grasping arms 11 and 16. The arm 16 is fixed to the support 36 but the arm 11 is fixed to a shaft 12 journalled in the support 36. 14 is an operating arm fixed to the said shaft 12. The tubular member 31 can be turned 90° in either direction from the normal position shown in FIGS. 1 and 2. This turning in either direction is carried out by means of the operating cylinder 35 which turns the toothed segment 32 which is journalled on the shaft 33 on the arm 34. The toothed segment 32 is in mesh with the gear wheel 28 in which the tubular part 31 is axially movable.

The welding machine is also provided with a loading device for U-formed link parts which device is carried by a bracket 6. The said device consists of a block 37 having a T-formed groove 7 and a holding magnet 3 which is attached to the connecting rod 2 of the operating cylinder 1.

When welding together two U-formed link parts of a chain link, a link part 17 is held between the clamping dies 18 and 19 of the stationary pair of clamping dies and a U-formed link part 9 between the dies 13 and 14 of the movable pair of clamping dies, as shown in FIG. 1 and FIG. 5. The U-formed link part 8, hooked together with the link part 9 is held by the arms 11 and 16. The movement of the movable pair of clamping dies against the welding position is achieved by the operating cylinder 24 which turns the swinging bracket 20 around the bearing 22. When the link parts 9 and 17 have been brought into contact with each other the welding current is switched on. After welding together the two link parts 9 and 17 to a chain link, the dies 13 and 19 are raised by the pistons in the operating cylinders 15 and 21 whereafter the piston in the operating cylinder 26 moves the tubular member 31 and the grasping arms 11 and 16 and the link part 8 is held by these grasping arms until the position shown in FIG. 3. In this position the tubular part 31 and the grasping arms 11 and 16 are turned 90° whereafter the link part 8 is placed between the clamping dies 18 and 19 in the stationary pair of clamping dies. When the link part has been clamped between the dies the grasping arms are opened and moved towards the right until they take the position shown in FIG. 4. In this position they are turned back to their normal position and move towards the left through the clamping dies until they take the position shown in FIG. 1.

U-formed link parts are fed into the machine in the following way, two chain link parts 4 and 5 in two successive links in the chain, are hooked together and placed in the T-formed groove 7 in the block 37 in the relative position they should have in the chain. The link part 4 is placed vertically with one of its branches in the narrowest part of the groove and is held by the magnet 3. The link part 5 is placed horizontally in the upper part of the T-groove 7 and is guided by the lists 10. The link parts are, by means of the operating cylinder 1, placed between the clamping dies 13 and 14 in the pair of movable clamping dies without changing their relative position. When the link parts have got the position shown by the parts 8 and 9 in FIGS. 1 and 5, one of them is clamped between the clamping dies by moving the clamping die 13 downwards by means of the operating cylinder 15 and the other link part is grasped by the arms 11 and 16. The magnet 3 is then moved back to the position shown in FIG. 1 by means of the operating cylinder 1.

In the case that the welding machine shall be combined with a device for taking away the comparatively small bulge when the welded link is still held by the clamping dies the grasping arms cannot hold the link part 9 during the welding operation. The clamping dies 13 and 14 may then be provided with special clamping means for this link part so that it is held in the right position when the magnet is moved away. The said holding device is not shown in the figures.

This application is a division of Serial No. 631,248, filed December 28, 1956, now abandoned.

We claim as our invention:

1. Method for making chains in which the diameter of the material in the chain links is between 12 and 25 mm., the ends of said chain links before welding having smaller cross section than the rest of the links, which comprises welding said chain links together by means of projection welding with a welding pressure of 4–6 kg. per mm.$^2$ and a welding current of 50–80 amperes per mm.$^2$.

2. Method as claimed in claim 1, in which the ends of said chain links before welding have a conical shape.

References Cited in the file of this patent
UNITED STATES PATENTS

| | | |
|---|---|---|
| 385,385 | Thomson | July 3, 1888 |
| 914,946 | Haldy | Mar. 9, 1909 |
| 1,256,117 | Duncan | Feb. 12, 1918 |
| 1,452,942 | Thomson | Apr. 24, 1923 |
| 2,021,157 | Stahl | Nov. 19, 1935 |